Patented Apr. 8, 1952

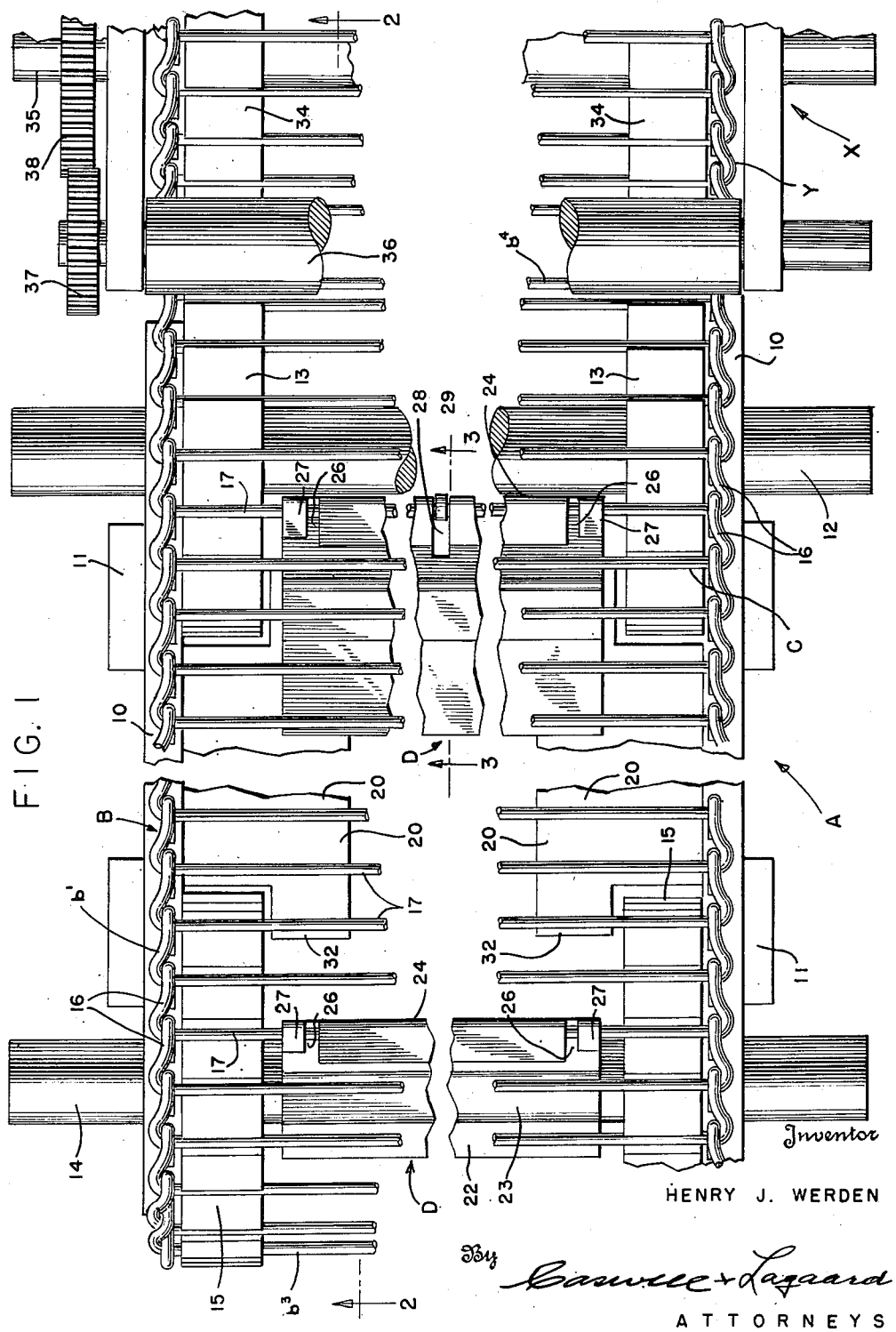

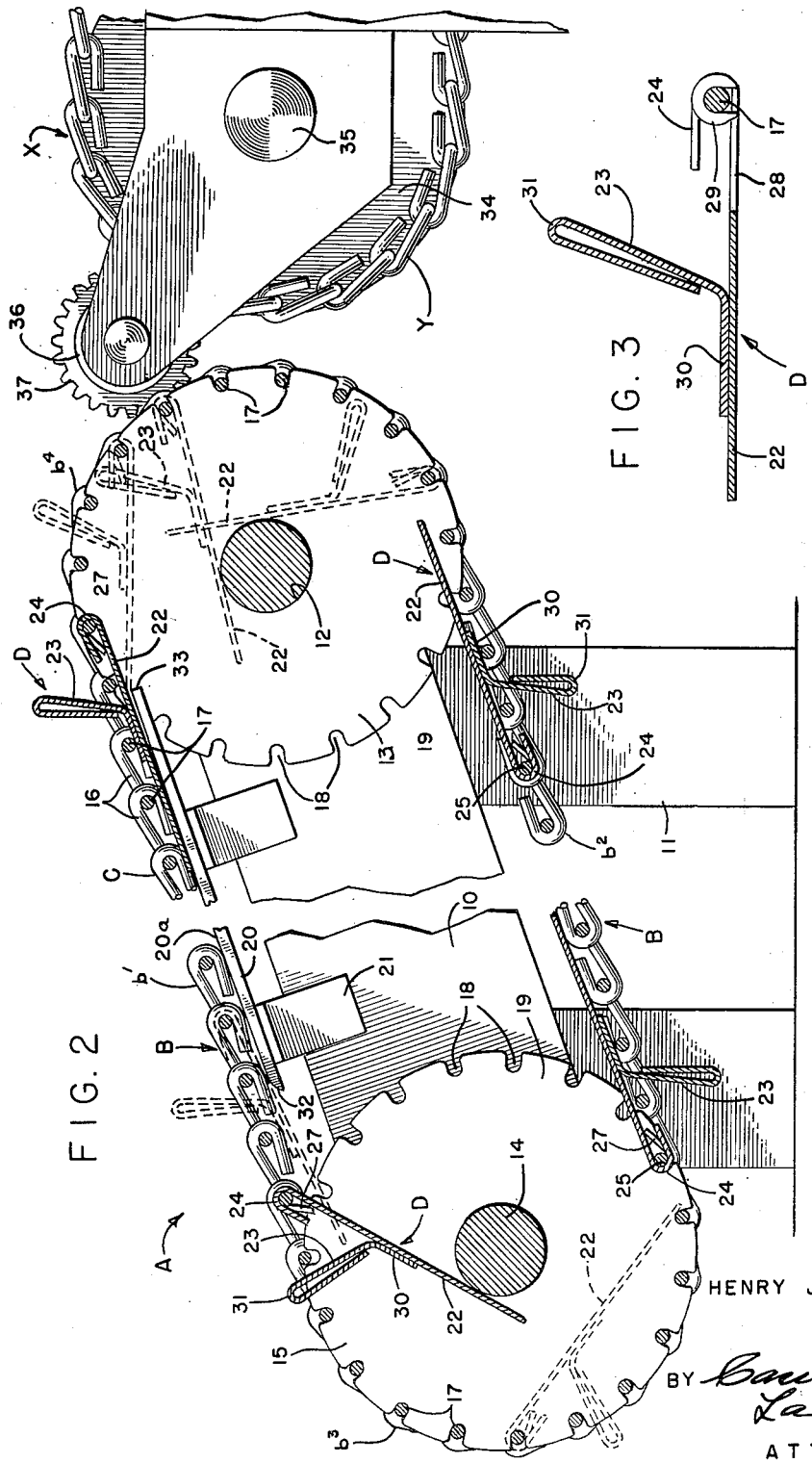

2,591,987

UNITED STATES PATENT OFFICE 2,591,987

ENDLESS CONVEYER HAVING RETRACTABLE FLIGHTS

Henry J. Werden, West St. Paul, Minn., assignor to Zinsmaster Baking Company, Minneapolis, Minn., a corporation of Minnesota Application April 28, 1951, Serial No. 223,577

8 Claims. (Cl. 198—197)

My invention relates to improvements in endless conveyors having retractable flights.

For handling fragile articles and small articles relatively light in weight such as bread and other pastries, confections and the like, it has been found that conveyors employing the conventional grid belt, consisting of cross-reaches of wire linked together at their ends and running over wheels at the marginal portions of the belt, provide satisfactory means of conveying articles horizontally or substantially so from one locality to another. Such grid conveyors are frequently employed in series, one conveyor leading to another, and it often occurs that a conveyor in the series will be inclined to convey articles from one level to a higher level. On such an inclined or sloping conveyor, articles sought to be elevated thereby will slide down the upper article-carrying run of the grid belt and thus fail to be advanced to the higher elevation as intended. Flights rigidly secured to grid belts have been employed to prevent such retrograde movement of articles on such belts, but rigid flights have been unsatisfactory for many purposes, particularly in the handling of fragile articles and small articles whether fragile or not. For their accommodation, rigid flights on the belt of an inclined conveyor require relatively exaggerated spacing between the ends of such conveyor and the adjacent ends of companion conveyors with the result that at the lower end of the inclined conveyor, difficulty is met in picking up articles from a lower companion conveyor if one is present, and with the further result that, at the upper end of the inclined conveyor, articles are often injured by being jammed between the inclined conveyor and the upper companion conveyor. Moreover, this jamming of articles subjects the conveyor structures themselves to damage. To overcome these disadvantages this invention contemplates the employment of retractable flights in lieu of rigid flights on the grid belt of an inclined conveyor. I am aware that it is old in the art to provide specially constructed conveyor belts with specially constructed retractable flights for various special purposes. However, I am unaware that anyone heretofore has ever devised a conveyor with a conventional grid belt having retractable flights applied thereto and operating in a manner whereby articles may be effectively picked up by the grid belt and carried along thereby and, finally, passed on to a companion conveyor without injury to such articles or to the conveyor structures.

An object of the invention, therefore, is to provide an improved conveyor of simple, durable, efficient and relatively inexpensive construction employing a conventional grid belt and having retractable flights therefor adapted to be conveniently applied thereto and to be readily actuated in such structure.

Other objects of the invention reside in the novel combination and arrangement of parts and in the details of construction hereinafter illustrated and/or described.

Briefly describing my improved construction, it may be stated that along the marginal portions at each turn of the grid belt employed, the wire cross-reaches of the grid belt ride on a pair of relatively spaced belt-supporting wheels mounted on a wheel-supporting shaft. The wheels at the upper turn of the grid belt ordinarily will be sprocket wheels with their supporting shaft driven to apply traction to the upper article-carrying run of said belt and move it toward the upper delivery end of the conveyor. Between the turns of the grid belt, the marginal portions of the upper run of said belt ride along belt-supporting rails. The retractable flights are applied to the grid belt at intervals therealong. Each retractable flight consists of an elongated shoe-plate and an abutment-vane extending lengthwise of the shoe-plate upstanding edgewise therefrom intermediately thereof. The shoe-plate has a marginally hooked portion longitudinally thereof which is adapted to be caught about a cross-reach of the grid belt hingedly to connect the shoe-plate thereto within the loop of the grid belt. In length, the shoe-plate is of a lesser dimension than the distance between paired belt-supporting wheels and of a somewhat greater dimension than the distance between the belt-supporting rails. Thus, between the turns of the grid belt, at the upper article-carrying run thereof, the shoe-plate rides flatwise at its end portions along the upper surfaces of the belt-supporting rails with the abutment-vane projecting upwardly between adjacent cross-reaches of the several cross-reaches of the grid belt which overlie said shoe-plate. At the delivery end of the conveyor, the belt-supporting rails terminate short of the upper turn of the grid belt allowing the flight to swing down by reason of its own weight causing the retraction of the abutment-vane into the loop of the belt at said turn thereof. Swinging downward, the shoe-plate of the flight encounters the upper wheel-supporting shaft and follows around it until said shoe-plate attains and passes an edgewise uprighted position, whereupon said shoe-plate tips top-side down and rests against cross-reaches of the grid belt at the inner side of the return run thereof. At the receiving end of the conveyor, the shoe-plate of the flight is led by the grid belt at its lower turn into an edgewise uprighted position, whereupon it encounters and follows around the lower wheel-supporting shaft being thereby tilted toward parallelism with the belt-supporting rails causing the abutment-vane to be partially projected outwardly from within the loop of the grid belt between adjacent cross-reaches thereof. The lower ends of the belt-supporting rails are located relative to said lower-wheel-supporting shaft so that they will be encountered by the shoe-plate and act in cam-like fashion to complete the tilting of the shoe-plate into rail-riding position flatwise of said rails. As the shoe-plate assumes flatwise position on the belt-supporting rails, the abutment-vane on said shoe-plate becomes fully projected from the article-carrying run of the grid belt for its working tour along the conveyor. The hooked leading portion of the shoe-plate is slit transversely thereof near each of its ends to provide terminal tab-like keepers which are bent around the cross-reach of the grid belt to which the flight is attached, thereby to retain said shoe-plate safely hinged to such cross-reach. Said hooked portion of said shoe-plate is also formed with a slot midlength thereof to receive a stop-collar which is secured to the cross-reach of the grid belt about which the shoe-plate pivots, such stop-collar serving to deprive the shoe-plate of lengthwise movement relative to such cross-reach.

In the drawings:

Fig. 1 is a plan view partly broken away, illustrating a form of conveyor constructed in accordance with my invention.

Fig. 2 is an elevational sectional view taken as on the line 2—2 of Fig. 1.

Fig. 3 is a sectional view in detail, taken as on the line 3—3 of Fig. 1, showing a portion of one of the conveyor flights together with an end stop therefor applied to a cross-reach of the grid belt.

In the illustrated form of my invention, the inclined conveyor A has relatively spaced side frame members 10 supported on legs 11. Revolubly mounted at its ends in the upper end portions of said side frame members 10 is a horizontal drive shaft 12 which is driven by any suitable means in a clockwise direction as seen in Fig. 2. On this drive shaft 12 between the side frame members 10 are fixed a pair of relatively spaced sprocket wheels 13. In the lower end portions of the side frame members 10, a horizontal idler shaft 14 is journaled at its ends and on this shaft 14 between said side frame members 10 are a pair of sprocket wheels 15 matching the sprocket wheels 13 on said drive shaft 12. B is an endless traveling grid belt of conventional form, the same having an upper or article-carrying run $b^1$, a lower or return run $b^2$, a lower turn $b^3$ leading upwardly from the return run $b^2$ to said article-carrying run $b^1$, and an upper turn $b^4$ leading downwardly from said article-carrying run $b^1$ to said return run $b^2$ of the belt B. Said belt B extends around the pairs of sprocket wheels 13, 15 and is marginally supported thereby at its said upper and lower turns $b^4$, $b^3$. Said grid belt B consists of similar links C, each link comprising a length of wire formed with hooks 16 at the ends of a straight intermediate portion constituting a cross-reach 17, said hooks 16 being caught about the cross-reach 17 of the preceding link C.

These grid-like cross-reaches 17 of the belt B mesh with the sprocket wheels 13, 15, said cross-reaches 17 being received at their end portions in the notches 18 between the teeth 19 of said sprocket wheels 13, 15.

The upper run $b^1$ of the belt B is marginally supported between the upper and lower pairs of sprocket wheels 13, 15 by means of a pair of rails 20, there being one rail 20 for each side frame member 10, each rail 20 being mounted on brackets 21 secured to its respective side frame member 10. Moving from the lower pair of sprocket wheels 15 to the upper pair of sprocket wheels 13, the upper run $b^1$ of the belt B rides along said rails 20, the end portions of the cross-reaches 17, except those cross-reaches as hereinafter noted, bearing upon the upper faces or track surfaces $21^a$ of said rails 20.

At intervals therealong, said belt B is provided with retractable flights D. Each flight D comprises an elongated shoe-plate 22 and an abutment-vane 23, both preferably of sheet metal. The shoe-plate 22, though mainly flat, has a marginal hooked portion 24 fashioned by turning one of the longitudinal marginal portions of said shoe-plate 22 up and then back forming a hook-bight 25 having as inner radius slightly greater than the radius of the wire forming the cross-reaches 17 of the belt B. Said hooked portion 24 of the shoe-plate 22 is caught about the intermediate portion of one of the cross-reaches 17 of the belt from within the loop of said belt, thereby hingedly connecting said shoe-plate 22 to such cross reach 17. Near its ends the hooked portion 24 of the shoe-plate 22 is slit transversely thereof, as at 26, to provide terminal keeper-tabs 27. These tabs 27 are bent down about the cross-reach 17 to which the shoe-plate 22 is applied and, thus bent, said tabs 27 retain said shoe-plate 22 hingedly hooked to such cross-reach 17. Said hooked portion 24 of the shoe-plate 22 is formed with a notch 28 transversely thereof intermediate its ends. Upon hooking the shoe-plate 22 to its respective cross-reach 17 of the belt B, said notch 28 receives a stop-collar 29 which is secured to such cross-reach 17, such stop-collar 29 serving to deprive the shoe-plate 22 of endwise movement on said cross-reach 17. The shoe-plate 22 is of a lesser lengthwise dimension than the distance between the paired sprocket wheels 13, also the paired sprocket wheels 15, but is of a greater lengthwise dimension than the distance between the belt supporting rails 20, whereby the shoe-plate 22 may hingedly swing on the belt B between said paired sprocket wheels 12, 15 and yet ride at its end portions on the said belt supporting rails 20 at the upper run $b^1$ of said belt. Said shoe-plate 22 in width is of a dimension greater than the distance between adjacent cross-reaches 17 of the belt B and at least substantially that of the radius of the sprocket wheels 13, 15, yet less than the diameter of said wheels.

The abutment-vane 23 is mounted on the shoe-plate 22 coextensively therewith intermediately thereof in a generally upstanding position slightly canted toward the hooked marginal portion 24 of said shoe-plate. This vane 23 has a base-flange 30 resting on and secured to the upper face of said shoe-plate 22, said vane being turned back on itself at the upper portion thereof to provide it with a smooth rolled outer edge 31. Upon the swinging of the shoe-plate 22 relative to the belt B, the abutment-vane 23 is adapted to be projected outwardly from the belt B between adjacent cross-reaches 17 thereof into article-engaging position and to be withdrawn into the loop of belt B into inoperative position.

Advancing at the top of the lower turn $b_3$ of the belt B, a flight D is pendulously downswung from its respective cross-reach 17, the vane 23 thereof being wholly retracted within said turn. In the further advancement of said flight B, the trailing marginal portion of the shoe-plate 22 engages the lower shaft 14 which acts in cam-like fashion to tilt the shoe-plate 22 toward parallelism with the belt-supporting rails 20 and initiate the projection of the abutment-vane 23 from the belt B. Becoming disengaged from the shaft 14, the advancing shoe-plate 22 engages the lower end portions 32 of the rails 20 which also act in cam-like fashion to continue said tilting of the shoe-plate 22 and thereby cause the further projection of the abutment-vane 23 from the belt B, said cam-like action of said end portions 32 of said rails 20 ultimately guiding the shoe-plate 22 into position flatly bearing on the upper track surfaces $20^a$ of said rails 20 with several of the cross-reaches 17 of the belt B overlying said shoe-plate 22 and with the abutment-vane 23 fully projected from the belt B. Articles placed on the upper run $b^1$ of the belt B in advance of the projected abutment-vane 23 are kept thereby from sliding down said run $b^1$ which, through the cross-reaches 17 of the belt B overlying the shoe-plate 22, holds said shoe-plate down on the track-surfaces $20^a$ of said rails 20 thereby retaining the abutment-vane 23 firmly in its operative projected position to resist any tendency of the articles to slide on the belt B. When the trailing edge of the shoe-plate 22 passes the upper ends 33 of the rails 20 at the delivery end of the conveyor A, said shoe-plate swingingly tilts down into engagement with the upper shaft 12, such down-tilting movement of said shoe-plate 22 resulting in the retraction of the abutment-vane 23 into the upper turn $b^4$ of the belt B. Thereafter, as said belt advances, said shaft 12 in cam-like manner further tilts the shoe-plate 22 until it passes position standing on its hinged edge, whereupon said shoe-plate 22 hingedly falls top side down against the inner side of the belt B, whence it returns on the lower run $b^2$ of said belt to starting position at the lower turn $b^3$ thereof.

Since retraction of the flight D at the beginning of the upper turn $b^4$ of the belt B, results in the full withdrawal of the abutment-vane into protected position within the loop of the belt, it is possible to locate the turn at the receiving end of a companion horizontal conveyor in close proximity relative to said upper turn $b^4$ of the inclined conveyor A and thus facilitate the transfer of articles from said inclined conveyor A to the companion horizontal conveyor. Such a companion conveyor, designated by the reference character X, is shown in the drawings, said companion conveyor X being illustrated as equipped with a belt Y running over sprocket wheels 34 on a shaft 35, and further equipped with a transfer roller 36 having a gear 37 thereon meshing with a gear 38 on said shaft 35. This transfer roller 36, it will be noted, is located immediately adjacent the upper turn $b^4$ of the belt B of the inclined conveyor A, which disposition of said roller 36 is permissible by reason of the fact that the flights D on said inclined conveyor A are fully retracted at the upper turn $b^4$ of the belt B before said flights D otherwise could encounter said transfer roller 36. Acting as they do, the said flights D serve to keep the belt-carried articles in progress up the inclined upper run $b^1$ of the belt B and over the transfer roller 36 to the belt Y of the companion conveyor X, all without danger of injury to such articles or to the flights D or other parts of said conveyors.

Changes in the specific form of the invention, as herein described, may be made within the scope of what is claimed without departing from the spirit of the invention.

Having described the invention, what is claimed as new and desired to be protected by Letters Patent is:

1. In an inclined conveyor, a frame, an endless belt formed with grid-like cross-reaches and having upper and lower runs and upper and lower turns therebetween, revoluble supports on said frame supporting said belt at its marginal portions about the turns thereof, rails on the frame supporting the upper run of the belt along portions thereof adjacent its said marginal portions, a plurality of retractable flights located at intervals along the belt, each flight including an elongated shoe-plate within the loop of the belt having a marginally hooked portion longitudinally thereof caught about one of the belt's cross-reaches and hingedly connecting the shoe-plate thereto, the end portions of said shoe-plate being adapted to overreach said belt-supporting rails, the width of said shoe-plate being greater than the distance between adjacent cross-reaches of the belt, the marginally hooked portion of said shoe-plate being slit transversely thereof near its ends forming terminal keeper-tabs, said keeper-tabs being bent about the cross-reach to which the shoe-plate is hooked holding said shoe-plate hooked thereto, end thrust stop means on said cross-reach engaged by the hooked portion of the shoe-plate and depriving said shoe-plate of endwise movement on said cross-reach, cam means engageable by the down-swung shoe-plate at the lower turn of the belt, said cam means being adapted to swing said shoe-plate and guide it into position to bear substantially flatly upon said rails beneath the upper run of the belt, said flight including an article-engaging member extending upwardly from the top of said shoe-plate and adapted to project beyond the belt between adjacent cross-reaches thereof as the shoe-plate is guided onto said rails, said shoe-plate being adapted to swing downwardly from said rails and withdraw the article-engaging member into the upper turn of the belt, second cam means engageable by the down-swung shoe-plate at said upper turn of the belt, said second cam means being adapted to tilt and invert said flight inducing it to fall hingedly into position top side down against the inner side of the belt for return on the lower run thereof to said lower turn of the belt.

2. In an inclined conveyor, a frame, an endless belt formed with grid-like cross-reaches and having upper and lower runs and upper and lower turns therebetween, revoluble supports on said frame supporting said belt at its marginal portions about the turns thereof, rails on the frame supporting the upper run of the belt along portions thereof adjacent its said marginal portions, a plurality of retractable flights located at intervals along the belt, each flight including an elongated shoe-plate within the loop of the belt having a marginally hooked portion longitudinally thereof caught about one of the belt's cross-reaches hingedly connecting the shoe-plate thereto, the end portions of said shoe-plate being adapted to overreach said belt-supporting rails, the width of the shoe-plate being greater than the distance between adjacent cross-reaches of the belt, the marginally hooked portion of said shoe-plate having a slot therein transversely thereof, a stop-collar secured to the cross-reach and receivable in said slot upon the hooking of the shoe-plate to said cross-reach, said stop-collar depriving said shoe-plate of endwise movement on said cross-reach, cam means engageable by the down-swung shoe member at the lower turn of the belt, said cam means being adapted to swing said shoe-plate and guide it into position to bear substantially flatly upon said rails beneath the upper run of the belt, said flight including an article-engaging member extending upwardly from the top of said shoe-plate and adapted to project beyond the belt between adjacent cross-reaches thereof as the shoe-plate is guided onto said rails, said shoe-plate being adapted to swing downwardly from said rails and withdraw said article-engaging member into the upper turn of the belt, second cam means engageable by the down-swung shoe-plate at said upper turn of the belt, said second cam means being adapted to tilt and invert said flight inducing it to fall hingedly into position top side down against the inner side of the belt for return on the lower run thereof to said lower run of said belt.

3. In an inclined conveyor, a frame, an endless belt formed with grid-like cross-reaches and having upper and lower runs and upper and lower turns therebetween, revoluble supports on said frame supporting said belt at its marginal portions about the turns thereof, rails on the frame supporting the upper run of the belt along portions thereof adjacent its said marginal portions, a plurality of retractable flights located at intervals along the belt, each flight including an elongated shoe-plate within the loop of the belt having a marginally hooked portion longitudinally thereof caught about one of the belt's cross-reaches hingedly connecting the shoe-plate thereto, the width of the shoe-plate being greater than the distance between adjacent cross-reaches, the end portions of the shoe-plate being adapted to overreach said belt-supporting rails, cam means engageable by the down-swung shoe-plate at the lower turn of the belt, said cam means being adapted to swing said shoe-plate and guide it into position to bear substantially flatly upon said rails beneath the upper run of the belt, said flight including an article-engaging abutment-vane upstanding from and extending longitudinally of the shoe-plate said abutment-vane being of sheet material turned back on itself at its upper portion and adapted to project beyond the belt between adjacent cross-reaches thereof as the shoe-plate is guided onto said rails, said shoe-plate being adapted to swing downwardly from said rails and withdraw the article-engaging vane of the flight into the upper turn of the belt, second cam means engageable by the down-swung shoe-plate at said upper turn of the belt, said second cam means being adapted to tilt and invert said flight inducing it to fall hingedly into position top side down against the inner side of the belt for return on the lower run thereof to said lower turn of the belt.

4. In an inclined conveyor, a frame, an endless belt formed with grid-like cross-reaches and having upper and lower runs and upper and lower turns therebetween, a shaft mounted in the frame at each turn of the belt, a pair of spaced wheels on each shaft revolubly supporting the belt at the marginal portions thereof about their respective turn of said belt, rails on the frame supporting the upper run of the belt along portions thereof adjacent its said marginal portions, a plurality of retractable flights located at intervals along the belt, each flight including an elongated shoe-plate within the loop of the belt hingedly attached at a longitudinal marginal portion thereof to the intermediate portion of one of the belt's cross-reaches, the width of the shoe-plate being greater than the distance between adjacent cross-reaches of the belt, the end portions of said shoe-plate being adapted to overreach said belt supporting rails, cam means engageable by the down-swung shoe-plate at the lower turn of the belt, said cam means including as an element thereof the said shaft at said lower turn of said belt, said cam means being adapted to swing said shoe-plate and guide it into position to bear substantially flatly upon said rails beneath the upper run of the belt, said flight including an article-engaging member extending upwardly from the top of said shoe-plate and adapted to project beyond the belt between adjacent cross-reaches thereof as the shoe-plate is guided onto said rails, said shoe-plate being adapted to swing downwardly from said rails and withdraw the article-engaging member into the upper turn of the belt, said shaft at the upper turn of the belt being engageable by the down-swung shoe-plate and adapted in cam-like manner to tilt and invert said flight inducing it to fall hingedly into position top side down against the inner side of the belt for return on the lower run thereof to said lower turn of the belt.

5. In a conveyor, a frame, an endless belt formed with grid-like cross-reaches and having an upper article-carrying run, a lower return run, a turn leading downwardly from said upper run to said lower run and a turn leading upwardly from said lower run to said upper run, revoluble supports on said frame supporting said belt along its marginal portions about the turns thereof, rails on the frame supporting the upper run of the belt along portions thereof adjacent its said marginal portions, a plurality of retractable flights mounted on the belt at intervals therealong, each flight including an elongated shoe-plate within the loop of the belt hingedly attached at a longitudinal marginal portion thereof to the intermediate portion of one of the belt's cross-reaches, the width of the shoe-plate being greater than the distance between adjacent cross-reaches of the belt, the end portions of said shoe-plate being adapted to overreach said belt supporting rails, cam means engageable by the down-swung shoe-plate at the upwardly leading turn of the belt, said cam means being adapted to swing said shoe-plate and guide it into position to bear flatly upon said rails beneath the upper run of the belt, said flight including an article-engaging member extending upwardly from the top of said shoe-plate and adapted to project beyond the belt between adjacent cross-reaches thereof as the shoe-plate is guided onto said rails, said shoe-plate being adapted to swing downwardly from said rails and withdraw the article-engaging member into the downwardly leading turn of the belt, second cam means engageable by the down-swung shoe-plate at said downwardly leading turn of the belt, said second cam means being adapted to tilt and invert said flight inducing it to fall hingedly into position top side down against the inner side of the belt for return on the lower run thereof to said upwardly leading turn of the belt.

6. In a conveyor, a frame, an endless belt formed with grid-like cross reaches and having an upper article-carrying run, a lower return run, a turn leading downwardly from said upper run to said lower run and a turn leading upwardly from said lower run to said upper run, revoluble supports on said frame supporting said belt along its marginal portions about the turns thereof, a rail on the frame extending longitudinally of the belt and supporting the upper run thereof, a plurality of retractable flights mounted on the belt at intervals therealong, each flight including a thin shoe member within the loop of the belt hingedly attached to one of the belt's cross-reaches intermediately thereof and extending therefrom transversely thereof a distance greater than the distance between adjacent cross-reaches and less than the diameter of said turns of the belt, first cam means engageable by the down-swung shoe member at the upwardly leading turn of the belt, said cam means being adapted to swing said shoe member and guide it into position slidably to bear upon said rail beneath the advancing upper run of the belt, said flight including an article-engaging member extending upwardly from the top of said shoe member and adapted to project beyond the belt between adjacent cross-reaches thereof as the shoe member is guided onto said rail, said shoe member being adapted to swing downwardly from said rail and withdraw said article-engaging member from position projecting beyond the belt into position within the downwardly leading turn of said belt, second cam means adapted to tilt and invert said down-swung flight inducing it to fall hingedly into position top side down against the inner side of the belt for return on the lower run thereof to said upwardly leading turn of said belt.

7. In a conveyor, a frame, an endless belt formed with grid-like cross-reaches and having an upper article-carrying run, a lower return run, a turn leading downwardly from said upper run to said lower run and a turn leading upwardly from said lower run to said upper run, revoluble supports on said frame supporting said belt along its marginal portions about the turns thereof, a rail on the frame extending longitudinally of the belt and having a track surface subjacent the upper run of said belt, a plurality of retractable flights mounted on the belt at intervals therealong, each flight including a shoe member within the loop of the belt hingedly attached to one of the belt's cross-reaches intermediately thereof and extending therefrom transversely thereof a distance greater than the distance between adjacent cross-reaches and less than the distance between the upper and lower runs of said belt, first cam means engageable by the down-swung shoe member at the upwardly leading turn of the belt, said cam means being adapted to swing said shoe member into position onto the track surface of the rail to be drawn therealong by the belt, said flight including an article-engaging member extending upwardly from the top of said shoe member and adapted to project beyond the belt between adjacent cross-reaches thereof as the shoe member is guided onto said rail, said shoe member being adapted to swing downwardly from said rail and withdraw said article-engaging member from position projecting beyond the belt into position within the downwardly leading turn of said belt, second cam means engageable by the down-swung shoe member at said downwardly leading turn of the belt, said second cam means being adapted to tilt and invert said flight inducing it to fall hingedly into position top side down against the inner side of the belt for return on the lower run thereof to said upwardly leading turn of said belt.

8. In a conveyor, a frame, an endless link belt formed with cross-reaches and having an upper article-carrying run, a lower return run, a turn leading downwardly from said upper run to said lower run and a turn leading upwardly from said lower run to said upper run, revoluble supports on said frame supporting said belt along its marginal portions about the turns thereof, rails on the frame supporting the upper run of the belt along portions thereof adjacent its said marginal portions, a plurality of retractable flights mounted on the belt at intervals therealong, each flight including a relatively thin, flat, elongated shoe member within the loop of the belt hingedly attached at a longitudinal marginal portion thereof to the intermediate portion of one of the belt's cross-reaches, the end portions of said shoe member being adapted to overreach said belt-supporting rails, cam means engageable by the down-swung shoe member at the upwardly leading turn of the belt, said cam means being adapted to swing said shoe member and guide it into position to bear flatly upon said rails beneath the upper run of the belt, said flight including an article-engaging member extending upwardly from the top of said shoe member and adapted to project through the link belt as the shoe-plate is guided onto said rails, said shoe member being adapted to swing downwardly from said rails and withdraw the article-engaging member from projected position into position within the downwardly leading turn of the belt, second cam means engageable by the down-swung shoe member at said downwardly leading turn of the belt, said second cam means being adapted to tilt and invert said flight inducing it to fall hingedly into position top side down against the inner side of the belt for return on the lower run thereof to said upwardly leading turn of the belt.

HENRY J. WERDEN.

No references cited.